(12) United States Patent
Zetterstrom

(10) Patent No.: US 9,994,401 B2
(45) Date of Patent: Jun. 12, 2018

(54) TRANSFER ARRANGEMENT

(71) Applicant: TETRA LAVAL HOLDINGS & FINANCE S.A., Pully (CH)

(72) Inventor: Hakan Zetterstrom, Eslov (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days. days.

(21) Appl. No.: 15/318,308

(22) PCT Filed: Jun. 10, 2015

(86) PCT No.: PCT/EP2015/062953
§ 371 (c)(1),
(2) Date: Dec. 12, 2016

(87) PCT Pub. No.: WO2015/189277
PCT Pub. Date: Dec. 17, 2015

(65) Prior Publication Data
US 2017/0129716 A1    May 11, 2017

(30) Foreign Application Priority Data

Jun. 11, 2014   (SE) ........................................ 1450713

(51) Int. Cl.
*B65G 47/84*        (2006.01)
*B65G 17/32*        (2006.01)
(Continued)

(52) U.S. Cl.
CPC ........... *B65G 47/842* (2013.01); *B65G 17/12* (2013.01); *B65G 17/26* (2013.01); *B65G 17/323* (2013.01);
(Continued)

(58) Field of Classification Search
CPC ........................... B65G 47/842; B65G 17/323
See application file for complete search history.

(56) References Cited

U.S. PATENT DOCUMENTS

| | | | |
|---|---|---|---|
| 3,590,982 A * | 7/1971 | Banyas | B65G 47/842 |
| | | | 198/470.1 |
| 4,984,680 A * | 1/1991 | Hamano | B65G 47/847 |
| | | | 198/803.9 |

(Continued)

FOREIGN PATENT DOCUMENTS

| | | |
|---|---|---|
| DE | 20 2012 004015 U1 | 8/2012 |
| EP | 2 386 512 A1 | 11/2011 |

(Continued)

OTHER PUBLICATIONS

International Search Report (PCT/ISA/210) dated Sep. 3, 2015, by the European Patent Office as the International Searching Authority for International Application No. PCT/EP2015/062953.

(Continued)

*Primary Examiner* — Thomas Randazzo
(74) *Attorney, Agent, or Firm* — Buchanan Ingersoll & Rooney PC

(57) ABSTRACT

A transfer arrangement for transfer of packaging containers from a first conveyor arrangement to a second conveyor arrangement, wherein the transfer arrangement comprises at least one gripper arranged to engage the packaging containers frictionally.

16 Claims, 2 Drawing Sheets

(51) Int. Cl.
*B65G 47/86* (2006.01)
*B65G 17/12* (2006.01)
*B65G 17/26* (2006.01)

(52) U.S. Cl.
CPC ............... *B65G 2201/0244* (2013.01); *B65G 2201/0252* (2013.01)

(56) References Cited

U.S. PATENT DOCUMENTS

| | | | | |
|---|---|---|---|---|
| 5,261,520 A * | 11/1993 | Duke | ................. | B42C 19/08 198/375 |
| 5,743,377 A * | 4/1998 | Kronseder | ........... | B65G 47/847 198/470.1 |
| 6,938,753 B2 * | 9/2005 | Bonatti | ................. | B65G 47/847 198/470.1 |
| 8,002,107 B2 * | 8/2011 | Balzarin | ................ | B65G 29/00 198/470.1 |
| 8,360,492 B2 * | 1/2013 | Winzinger | ........... | B65G 17/323 294/106 |
| 8,720,670 B2 * | 5/2014 | Schulnig | .............. | B65G 47/847 198/470.1 |
| 8,813,948 B2 * | 8/2014 | Brunee | .................. | B65G 47/31 198/441 |
| 9,233,800 B2 * | 1/2016 | Senn | .................... | B65G 47/082 |
| 9,682,829 B2 * | 6/2017 | Keil | ....................... | B65G 47/71 |
| 2008/0044510 A1 * | 2/2008 | Doudement | ........ | B29C 49/4205 425/537 |
| 2011/0127143 A1 * | 6/2011 | Calzolari | ........... | B65G 21/2072 198/618 |
| 2011/0272249 A1 | 11/2011 | Berni | | |
| 2014/0008927 A1 | 1/2014 | Rousseau et al. | | |
| 2014/0041994 A1 | 2/2014 | Mader | | |

FOREIGN PATENT DOCUMENTS

| | | | | |
|---|---|---|---|---|
| WO | WO-2010088581 A1 * | 8/2010 | ............. | B65B 35/58 |
| WO | WO 2012/142719 A1 | 10/2012 | | |

OTHER PUBLICATIONS

Written Opinion (PCT/ISA/237) dated Sep. 3, 2015, by the European Patent Office as the International Searching Authority for International Application No. PCT/EP2015/062953.

* cited by examiner

TRANSFER ARRANGEMENT

TECHNICAL FIELD

The present invention relates to a transfer arrangement configured to transfer packaging containers, and in particular to a transfer arrangement configured to transfer packaging containers from a first conveyor arrangement to a second conveyor arrangement. The present invention also relates to particular components of such transfer arrangement.

TECHNICAL BACKGROUND

Within the field of packaging of foodstuff in individual packaging containers there is a need for conveyor arrangements for conveying the packaging containers through e.g. the process of filling the packaging containers. In such a process there is a need for transfer arrangements when e.g. a packaging container is transferred from a filling station to subsequent processing.

The technical area of product transfer is obviously relevant for various technical fields, and with the purpose of limiting the disclosure to a definable field the present disclosure will be limited to examples of applications within food processing, in particular processing pourable foodstuff.

SUMMARY

On a high-level the present disclosure relates to a transfer between a first conveyor arrangement and a second arrangement by means of a separate transfer arrangement. On a more detailed level the disclosure relates to details of grippers of the transfer arrangement and control of said grippers as well as to actions performed by the grippers. Furthermore the packages transported by the first conveyor arrangement may be subjected to a first atmosphere while the packages transported by the second conveyor arrangement may be subjected to a second atmosphere. Further details are defined in the appended claims and in the detailed description of embodiments. It may be important to note that the embodiments are given as examples only, and that features present in an embodiment may be removed or combined to form a non-disclosed embodiment, within the constraints given by the scope as defined by the claims.

According to a first aspect the present disclosure relates to a transfer arrangement for transfer of packaging containers from a first conveyor arrangement to a second conveyor arrangement, wherein the transfer arrangement comprises at least one gripper configured to engage the packaging containers frictionally.

The engagement may in any embodiment comprise lifting the packaging container from the first conveyer arrangement, suggestively but not limited to gripping the packaging container at one end thereof. This one end may be the end of the packaging container facing upwards in a transfer situation.

The frictional engagement may in one or more embodiments be performed by means of a gripper having gripper jaws arranged to clamp the packaging container.

In one or several embodiments the gripper comprises gripper elements configured to interact with a constructional detail of the packaging container so as to secure the packaging container. This interaction may be categorized as a frictional engagement within a broad sense, yet due to a locking function provided by the interaction there may be no need for a clamping force. Furthermore, the clamping providing a frictional engagement and the effect of an interaction with a constructional detail may be combined, such that the packaging container is secured by two means.

The gripper may in one or more embodiments may comprise two portions at least one of which being pivotally arranged, forming a gripper jaw.

The gripper is arranged on an endless conveyor, and there is at least one gripper, though in a foreseeable application several grippers are distributed equidistantly around the circumference of the endless conveyor.

Each gripper may be operationally connected to at least one cam curve such that the cam curve may control at least a vertical position of the gripper. In one or more embodiments the gripper is connected to the cam curve via a guide shaft, and wherein the guide shaft is slidably arranged in a carrier attached to the endless conveyor, thus allowing for a vertical motion.

The grippers may be configured to turn the packaging containers a set angle during transfer from the first conveyor arrangement to the second conveyor arrangement. This may be effected in many ways, which will be described in the detailed description.

The grippers may furthermore be arranged to apply a compressing force on the packaging container, in a longitudinal direction thereof, during handover to the second transport arrangement, which may simplify the downstream processing of the packaging containers.

The grippers may be arranged to open and release by the operation of a cam follower following a cam curve on the transfer arrangement.

In an even more elaborate embodiment the grippers are arranged to pick up packaging containers from the first conveyer arrangement at a first pitch and to release the packaging containers to the second conveyer arrangement at a second pitch, wherein the first pitch is greater than the second pitch.

DETAILED DESCRIPTION

Figure 1:
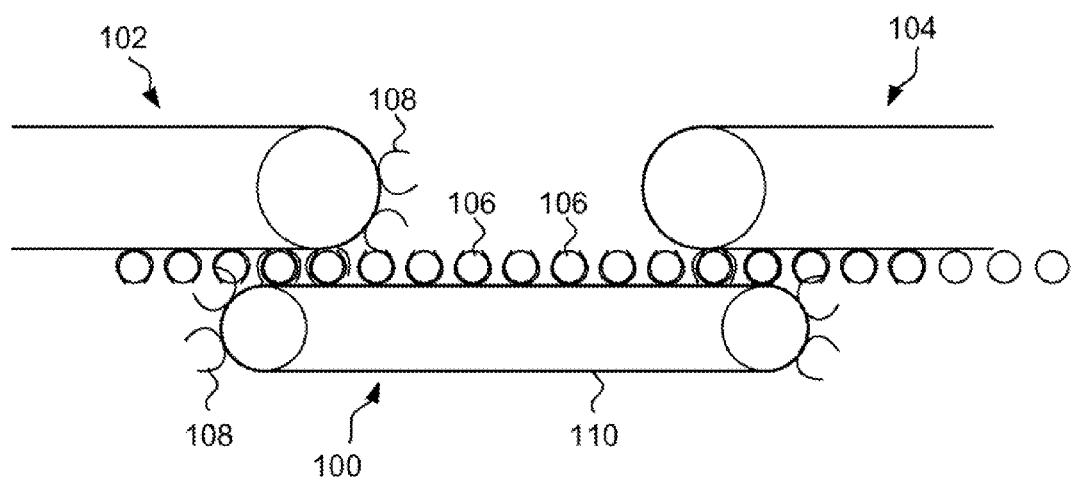
FIG. 1 is a rudimentary plan view of a transfer arrangement for transfer of packaging container from a first conveyor arrangement to a second conveyor arrangement.
Figure 2:
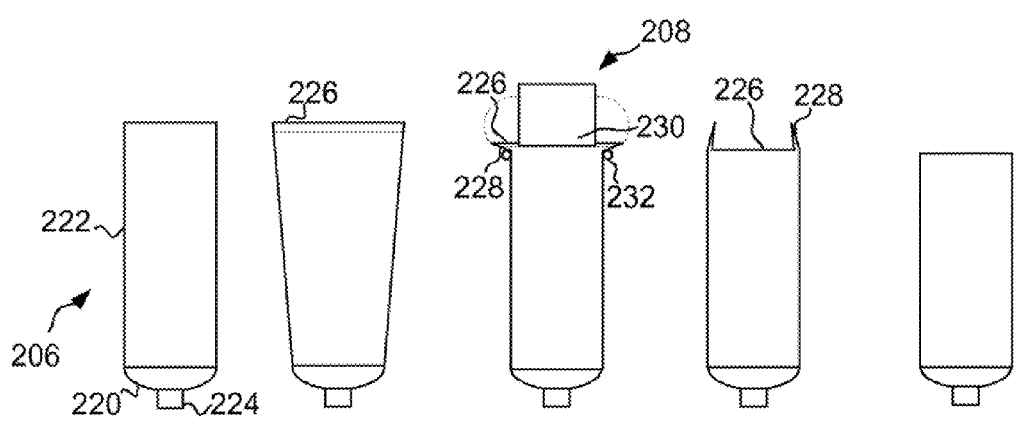
FIGS. 2*i-v* is a sequence showing the forming of packaging containers of a carton bottle type, also showing a schematic gripper.

In the drawings same or similar components have been given the same reference numeral preceded by the drawing number, i.e. the packaging container is given reference numeral 106 in FIG. 1, 206 in FIG. 2 etc.

In the plan view of FIG. 1 a number of packaging containers 106 are shown as they are transported through a series of events. The packaging containers 106 may for example be leaving a filling machine 102 in which they have been sterilized, filled and sealed. The packaging containers 106 are shown in the form of carton bottles, i.e. packaging containers comprising a carton sleeve and a plastic top, such as the packaging container Tetra Top®. It should be noted however, that for the general purposes of the present disclosure the packaging containers 106 could as well be cans, glass bottles, plastic bottles, PET bottles, container made from packaging laminate, etc. In some embodiments however use may be made of the particular properties posed by carton bottles, while corresponding or alternative properties may be, or may be made, available on other packaging containers. The purpose of FIG. 1 is to assist in describing, some general features rather than to disclose an embodiment of the present invention, and therefore the level of detail is very low. The conveyor arrangements 102, 104 as well as the transfer arrangement 100 comprise grippers 108, which have been given the same reference numeral in FIG. 1. When the grippers 108 are described in more detail it will be the grippers of the transfer arrangement 100 which are the relevant ones, and the first and second conveyor arrangement 102 and 104 respectively may be provided with carriers holding the packaging containers rather than actual grippers 108, which is a less important detail. In any case, though not illustrated the grippers 108 of the transfer arrangement are distributed evenly and in register with the carriers or grippers of both the first conveyer arrangement 102 and the second conveyor arrangement 104 in an operational setup.

In the illustrated view the first conveyor arrangement 102 forwards the packaging containers through the various stations of a packaging machine (or filling machine) in a continuous manner. In other embodiments the conveyor arrangement 102 may use intermittent motion, i.e. that the packaging containers 106 are indexed forward stepwise rather than being in continuous movement. Existing filling machines are generally based on one of these two concepts. The actual concept chosen may affect the design of the stations of the filling machine, typically including a sterilization station, a venting station, a filling station, and a sealing station. In the area following the sterilization station to the sealing station there is, in the case of filling of perishable products such as foodstuff, an aseptic atmosphere. All potentially hazardous germs and spores are incapacitated in the sterilization step and by ensuring that there is no reinfection before the packaging container is sealed the asepticity of the product is ensured. "Asepticity" may in other situations be replaced by an "adequate level of sterility ensuring that the projected shelflife is assured". The phrases are not interchangeable in a literal change, but for the purposes of the present disclosure it may be relevant to be aware of that there are different levels of sterility and/or asepticity, and though specific features in relation to the present invention may be directed towards maintaining e.g. asepticity the disclosure on the whole should not be limited in this aspect.

The present disclosure does not discriminate the type of transport arrangement used for the first conveyor arrangement 102 yet for the embodiment showed in FIG. 1 each packaging container is carried by a separate carrier, and each carrier is attached to a moving belt, chain or wire, or several belts/chains/wires (not shown in FIG. 1). The same first conveyor arrangement may be used to transport the packaging container through the entire filling machine, from an inlet end to an outlet end where the packaging container is handed over from the first conveyor arrangement to the transfer arrangement. In other options there are package handovers inside the filling machine, either temporal—e.g. the packaging containers leave the first conveyor arrangement for a while during its travel through the filling machine and is then returned to the first transport arrangement—or "permanent" handovers from an auxiliary conveyor arrangement to the first conveyor arrangement 102 at some point inside the packaging machine. These two alternatives may of course be combined.

In a handover section the packages are released, if at all necessary, from the carriers or gripper of the first conveyor arrangement 102 and secured by the grippers 108 of the transfer arrangement 100.

Without yet addressing details of the transfer arrangement 100 its purpose is to transfer the packaging containers 106 from the first conveyor arrangement 102 to the second conveyor arrangement 104. This may be performed while accomplishing or maintaining certain operational conditions. One condition could be that the protected atmosphere of the filling machine should not be affected. The transport arrangement of the second conveyor arrangement may or may not be of similar design as for the first conveyor arrangement, yet it by definition forms part of a downstream processing equipment, such as a folding device, a labelling machine, etc. If the packaging container 106 has been sealed there may be no strict requirement in terms of asepticity or sterility, though as a general rule any part of a machine handling packaging, containers for commercial use may benefit of having a high hygienic standard. In the illustrated embodiment the second transport arrangement is related to a final folder, a device where the sealed end of each packaging containers is folded such as to form a bottom of the resulting packaging container.

Before describing some more details of a particular embodiment of the present invention reference is made to FIG. 2 where a typical packaging container 206 of a carton-bottle type is shown as a sequence during the forming thereof. To the left 2*i* the rudimentary shape is shown, illustrating the condition of the carton bottle 206 ready for filling. The carton bottle 206 has a top 220 formed from plastic or another mouldable material. In other embodiments the plastic top 220 may be replaced by a folded packaging laminate top formed in one piece with the second constructional detail; the sleeve 222. The sleeve 222 is formed as a hollow cylinder formed by a packaging laminate. The cross section of the sleeve 222 conforms to the cross section of the top 220 in the area where the two are fused together. A closure arrangement 224 extends from the top 222 and may be formed in one piece therewith. The end of the sleeve 222 remote to the top 224, i.e. the bottom end, is open to begin with, and the packaging container 206 will be filled from the bottom end. After being filled the open end of the sleeve 222 is sealed. The seal may be effected by clamping the open end between two sealing jaws (not shown) and providing energy such that interacting surfaces of the packaging laminate fuse together. The sealing process will shape the packaging container as shown in 2*ii*. In a sideview (not shown) the front the sleeve will taper off towards the sealed end, where a seal fin 226 is formed. In this sealed state the packaging container may leave a filling machine without compromising the hygienic level of the product contained in the packaging container, still a commercial packaging container is not necessarily formed yet. The folding of a packaging container such as the one shown in FIG. 2 is described in other documents, e.g. WO2004054790, yet for the sake of completeness the fin formed in the sealing step will be pressed down and two primary flaps will be formed, as shown in FIG. 2*iii*. These primary flaps may then be folded further and finally attached to form the bottom of the packaging container, as indicated in FIGS. 2*iv* and 2*v*.

FIG. 2*iii* also indicates a first embodiment of a gripper 208 that could be used within the scope of the present invention. The gripper comprises a clamping portion 230 engaging with a portion of the fin 226, and two gripper elements 232 engaging with packaging container below the primary flaps 228. The gripper 208 takes advantage of the structural rigidity of the packaging laminate and how the primary flaps 228 will ensure a secure hold. In some embodiments it may be sufficient that the clamping portion 230 merely localises the fin 226, without applying any clamping force. Still, the application of a clamping force may be preferred in some applications.

Returning to FIG. 1 packaging containers 106 of the type illustrated in FIG. 2 may be gripped at one end thereof, using the grippers 208 described above or below. In the illustrated embodiment the packaging containers 106/206 are sealed when they are gripped, i.e. before they art gripped, and in the first portion of the transfer process the packaging containers leave what is the aseptic region, or if not aseptic at least a region having controlled atmosphere. The transfer arrangement 100 comprises a number of grippers 108/208 arranged on an endless belt 110 (a chain, a wire, a belt, or similar), and each gripper 108/208 is configured to grip and secure one or more packages 106/206. In one or more embodiment the gripper secures the packaging container by means of a frictional force, e.g. the gripper clamps the packaging container at the one end. In the present embodiment, however, the grip is secured (or complemented) by gripper elements engaging with a structural element of the packaging container. In the case of a bottle made from plastic or glass the structural element may be a portion of a closure, a neck ring or any other suitable structural element which may be used for grip-enhancing purposes. For the carton bottles of the present example it is preferred to use a portion of the sealed carton bottle, namely the fin portion or, one or more flaps formed therefrom.

Figure 3:
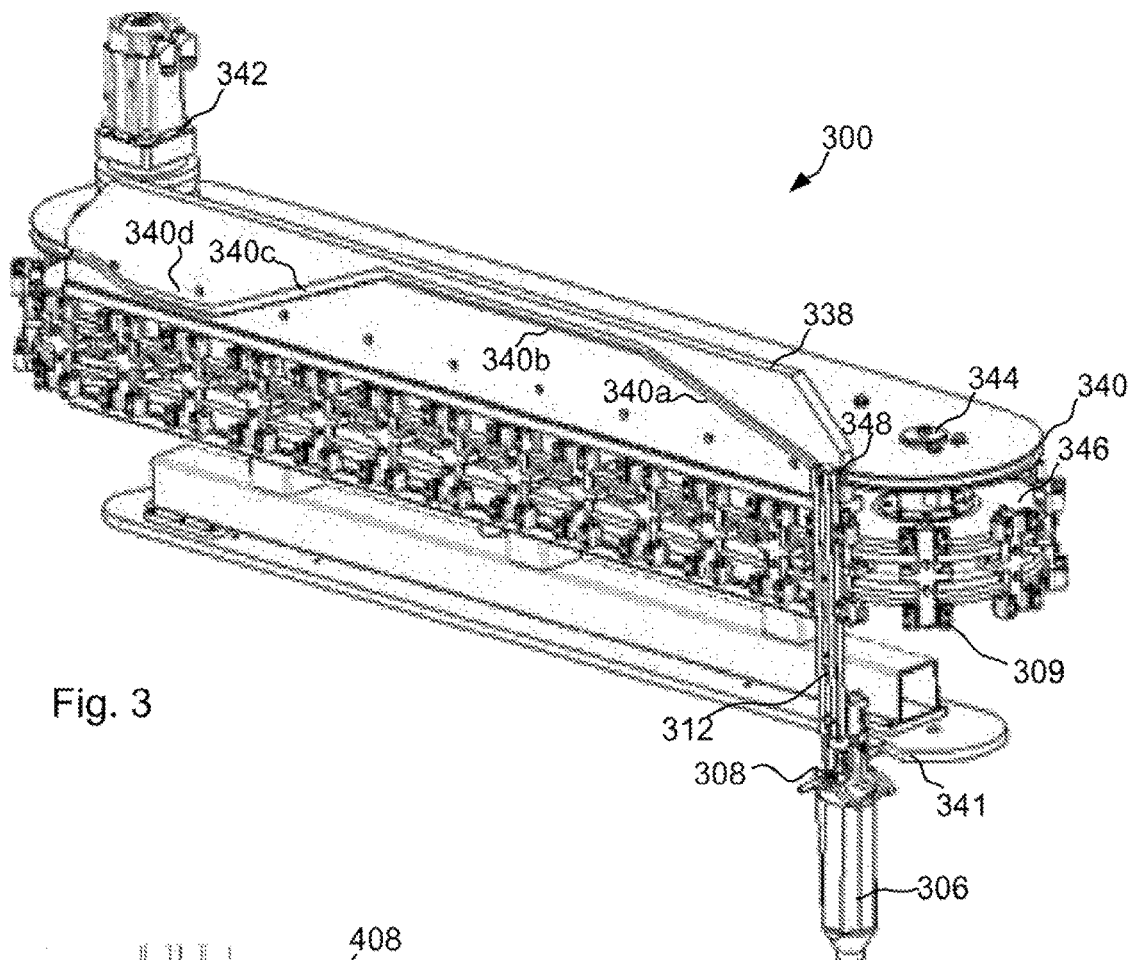
FIG. 3 is a perspective view of a transfer arrangement.

In FIG. 3 a more detailed perspective view of a transfer arrangement 300 is disclosed. In the illustrated embodiment the design is very simplistic and function are clearly separated. There is an inherent benefit in making a simplistic mechanical solution in a machine being operated at the projected rates of 20-30 000 packages per hour. Still, the present disclosure does not rule out more elaborate solutions, such as servo motors, independent cart technology etc. Starting to the upper left in FIG. 3 there is shown an electric drive motor 342 providing the drive for the transfer arrangement. The drive motor 342 is arranged at one end of a support plate, and a rotational shaft 344 with a guide wheel 346 is arranged at the other end. The transfer arrangement or rather the carriers 309 thereof is/are arranged to follow a race-track shaped path defined by the guide wheel 346 and a corresponding drive wheel connected to the drive motor 342 via a drive shaft (not shown). On the view shown the carriers 309 will travel from right to left. Only one gripper 310 is shown, yet in practice there is one gripper 310 for each carrier 309, and the carrier secures the gripper 308, or a guide shaft 312 thereof slidably. A first cam curve 340 is arranged in a cam plate 338 extending in a vertical orientation. From the shape of the cam curve it is possible to see that a cam follower 348 arranged in one end of the shaft 312 of the gripper 310 will guide the gripper 308 to enter at a first level, after which it will be raised (segment 340*a*) (when having gripped the packaging containers). Following the raise the gripper may remain at a constant level (segment 340*b*) before being lowered (340*c*) to release the packaging containers 306, the grip and release function will be described. It is also noticeable that for the present embodiment the gripper will be lowered a bit further, relatively speaking, such as to compress the bottom of the packaging container 306 and to initiate a process of final folding of the bottom end of the packaging container. Actually the entire packaging container will experience a compressing force, yet since the bottom end of the packaging container comprises the crease lines, i.e. the bottom folding pattern it is the bottom end that will be affected most. Allowing for the carrier and gripper to perform this operation results in one less operation that have to be incorporated in a final folder arrangement. The operation as such is readily achieved by merely reducing the distance between the gripper holding the packaging container and the carrier arranged to receive the packaging container during handover.

As the packaging containers arrive at the second transport arrangement the grippers open and release the packaging containers. Again this could be realized by cam followers of the gripper jaws entering a cam curve (segment 340*c*), essentially a solution being a mirror image of the pickup. In another embodiment the grippers are arranged to perform further operations vis-à-vis the packaging containers prior to being disengaged. An immediate example is that the grippers may be arranged to be lowered a bit further in relation to a first end of the packaging container (segment 340*d*), as mentioned above. This will cause a deformation of the packaging containers, at one end thereof, which is a desired step in a final folding of the packaging container. In this way the gripper may be arranged to perform the function of a prefolding plunge, such as the one disclosed in WO2011138252 by the present applicant. This embodiment of the feature, the prefolding, is limited to packaging containers of the carton bottle type, or rather packaging containers having a deformable portion. In the case of plastic bottles or glass bottles this further operation could instead consist in a rotative action, a turning action etc.

Figures 4A, 4B:
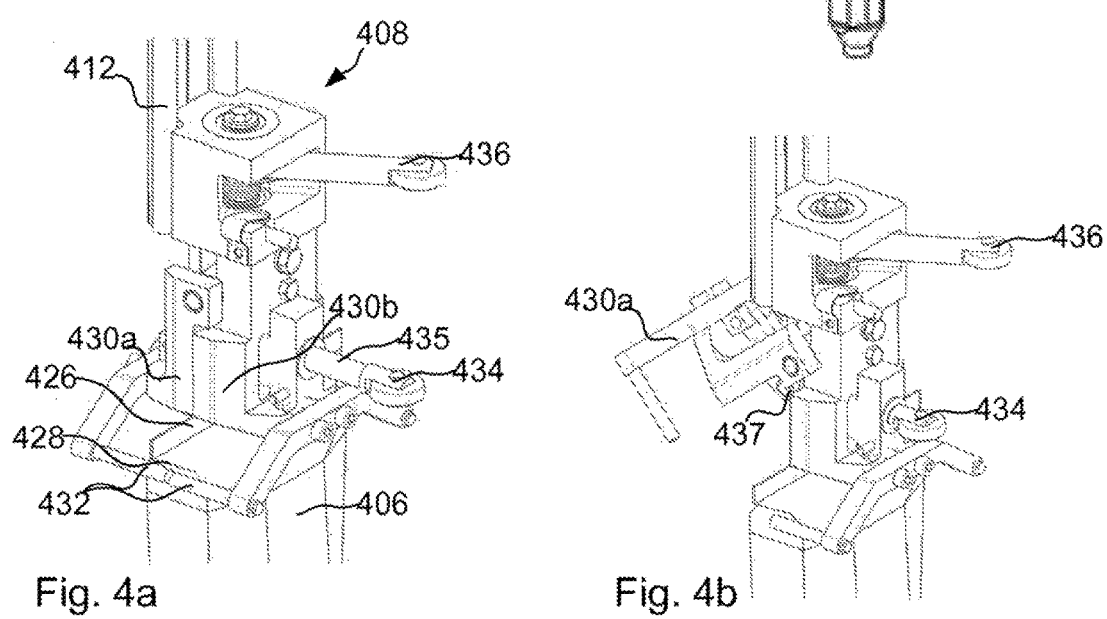
FIG. 4*a* is a partial perspective view of a gripper in a gripping position.
FIG. 4*b* is a partial perspective view of a gripper in a releasing position.

A gripper 408 is shown in some detail in the views of FIG. 4*a* and FIG. 4*b*. It comprises two opposing jaws 430*a* and 430*b*, at least one jaw 430*a* being pivotally arranged. By controlling the opposing jaws it will be possible to open or close the jaws in a suitable way. Again, in a simplistic approach the engagement of the jaws may be accomplished by a cam/cam curve interaction, i.e. that a cam follower on one or both of the jaws will follow a cam curve in an overhead structure such that opening and closing is performed at a suitable time. An example is illustrated by a cam follower having a shaft 435 with a linkage 437 connecting it to one of the jaws. In the view of FIG. 4*a* the jaws are closed and in FIG. 4*b* the jaws are opened, and the function of the cam follower 434 is readily understood. The jaws 430*a* and 430*b* are biased towards a closing direction, yet in other embodiments they may be biased towards an opening direction or not being biased at all. More elaborate means for controlling the grippers should not be excluded, yet for a high-performance machine this mechanical approach has proven to be a reliable solution. The actual gripper has first gripper area which is configured to grip the packaging container by the fin area, referred to as the jaws above, adapted to engage the fin area in a frictional hold. Furthermore the gripper has two gripper elements 432 extending from at least one of the jaws. In the present embodiment the gripper elements comprise two rods or shafts 432 extending at a right angle from each of the sealing jaw. These elements 432 are configured to be located below the extending fin portions 428 of the closed end of the packaging container 406. The structural stability provided by the fin 426 and how it may be positionally locked by the gripper area will maintain the shape of the end of the packaging container end 406, and consequently the weight of the packaging container will be carried by the gripper elements 432 in their engagement with the fin portion. Part of the weight may be distributed to the first gripper area, at least in some embodiments. In other embodiments the first gripper area may merely provide a support so as to prevent the sealed fin from collapsing, which would suffice in order to allow for the gripper elements to carry the weight of the packaging container. An effect of the latter embodiment is that the holding of the packaging container, which is filled at the time of transfer, may be very gentle. The shape of the gripper elements may be such that the load is distributed over a larger area of the packaging container while the first gripper area basically does not engage the packaging container at all, or at least only to a minimum degree. The gripper of FIGS. 4a and 4b may also comprise a third cam follower 436 arranged to effect a rotation of the gripper, more specifically a rotation of at least a portion comprising the jaws 90 degrees. Any other angle of rotation may be realized. In an embodiment where the packaging containers of FIG. 2 are transported a rotation of 90 degrees would enable a reduction of the distance between adjacent containers, due to the slightly elongate cross sectional shape. A shorter distance (a lower pitch) between packaging containers may result in slower machine speeds for the same output, which may be beneficial from a cost/performance perspective. For this reason the present disclosure also relates to a transfer arrangement configured to collect packaging containers at a first pitch, and releases the packaging containers at a second pitch, and that preferably the second pitch is smaller than the first pitch, i.e. the distance between adjacent packaging containers is reduced.

In the disclosed embodiment of FIG. 3 each gripper is configured to lift the packaging container after a grip has been secured. The lift may be effected to dislocate the packaging container from its carrier, or for any other reason. Again, there may be more or less elaborate ways of accomplishing the lift, some of which are described in the present specification.

The carrier as shown in FIGS. 3 and 4a and 4b comprises a vertical shaft 312, 412 connecting the gripper with the first cam curve 340, and since the vertical shaft 312, 412 is slidably arranged in the carrier 309 the cam curve may be effectively used to control the vertical position of the gripper.

Concerning the grip and release function and again referring to FIG. 3 there is a second cam curve 341 arranged in a horizontal plane. The cam curve interacts with a second cam follower and relative motion between the two will control the grip and release function in a direct way.

For convenience during manufacture of the illustrated packaging container there is also a third cam curve (not shown) and cam follower coupled to the gripper. The purpose of this particular setup is to rotate the packaging container 90 degrees (around a longitudinal axis thereof) so as to obtain an optimal positioning as it is released into the second transport arrangement for further processing. For this purpose a portion of the gripper, said portico comprising the jaws, is configured to rotate in relation to the remainder of the gripper (or relative to the carrier as such). Actually, this third cam curve may be reduced to a short block forcing the gripper to rotate in one direction or the other. For other packaging containers other or further manoeuvres may be realized.

The control system for the grippers may be very complex, using servos, independently controllable carriers, etc. yet still the present solution offers a simplicity which is sought for in an application with high demands on durability and performance. The present solution for the gripper may be completely mechanical, basically only being controlled by cam curves. Furthermore the grippers utilises constructional properties of the packaging container to ensure a secure and gentle grip. Furthermore, the versatility of the gripper solution may be used to perform further operations on the packaging container, a few of which have been mentioned.

The invention claimed is:

1. A transfer arrangement for transfer of packaging containers from a first conveyor arrangement to a second conveyor arrangement, wherein the transfer arrangement comprises at least one gripper configured to engage the packaging containers frictionally, the at least one gripper comprising two gripper elements configured to interact with a constructional detail of the packaging container so as to secure the packaging container, the transfer arrangement also comprising a carrier mounted on a movable endless conveyor so that the carrier moves together with the endless conveyor, a shaft mounted on the carrier so that the shaft moves together with the carrier and the endless conveyor, the shaft being movable in a vertical direction relative to the carrier to change a vertical position of the shaft, the two gripper elements being mounted on the shaft to move together with the shaft and vary the vertical position of the two gripper elements, a cam follower arranged on the shaft and engageable with a cam surface so that engagement of the cam follower with the cam surface moves the shaft in the vertical direction and thereby also moves the two gripper elements in the vertical direction, at least one of the gripper elements being movable between a position engaging the packaging container and a position releasing the packaging container by virtue of a cam arrangement.

2. The transfer arrangement of claim 1, wherein the at least one gripper element is pivotally arranged.

3. The transfer arrangement of claim 1, wherein the cam surface is part of a cam curve.

4. The transfer arrangement of claim 1, wherein the at least one gripper is configured to turn the packaging container a set angle during transfer from the first conveyor arrangement to the second conveyor arrangement.

5. The transfer arrangement of claim 1, wherein the two gripper elements are arranged to apply a compressing force on the packaging container, in a longitudinal direction of the packaging container, during handover to the second transport arrangement.

6. The transfer arrangement of claim 1, wherein the cam follower is a first cam follower and the cam surface is a second cam surface, and the cam arrangement comprises a second cam follower operatively connected to the at least one gripper element and engageable with a second cam surface.

7. The transfer arrangement of claim 1, wherein the two gripper elements are arranged to pick up the packaging container from the first conveyer arrangement at a first pitch and to release the packaging container to the second conveyer arrangement at a second pitch, wherein the first pitch is greater than the second pitch.

8. An arrangement that conveys packaging containers, the arrangement comprising:
  a first conveyor to convey the packaging containers;
  a second conveyor to convey the packaging containers, the first conveyor being spaced apart from the second conveyor;
  a transfer arrangement positioned to transfer the packaging containers from the first conveyor to the second conveyor, the transfer arrangement comprising a plurality of spaced apart grippers each mounted on a movable conveyor and each configured to frictionally engage one of the packaging containers, each of the grippers comprising a pair of gripper elements configured to interact with a constructional detail of the packaging container to secure the packaging container;

a plurality of carriers mounted on the movable conveyor and movable with the conveyor;

a first pair of the gripper elements being mounted on a shaft;

the shaft being mounted on one of the carriers to move together with the movable conveyor so that movement of the movable conveyor results in movement of the one carrier, the shaft and the first pair of gripper elements;

the shaft being slidable relative to the one carrier to move the shaft in a vertical direction;

a first cam follower arranged on the shaft and engageable with a first cam surface on a plate so that engagement of the first cam follower with the first cam surface moves the shaft in the vertical direction and thereby also moves the first pair of gripper elements in the vertical direction; and a second cam follower operatively connected to one of the gripper elements and engageable with a second cam surface to move the one gripper element between a position engaging the packaging container and a position releasing the packaging container.

9. The arrangement of claim 8, wherein the gripper elements are gripper jaws that clamp a portion of the packaging container by frictionally engaging the packaging container.

10. The arrangement of claim 8, wherein at least one of the gripper elements forming each gripper is pivotally arranged.

11. The arrangement of claim 8, wherein the conveyor on which the grippers are mounted is an endless conveyor, and the grippers are mounted on the endless conveyor in spaced apart relation to one another.

12. The arrangement of claim 8, wherein the grippers are arranged to pick up packaging containers from the first conveyer at a first pitch and to release the packaging containers to the second conveyer at a second pitch, wherein the first pitch is different from the second pitch.

13. The arrangement of claim 8, wherein the first conveyor includes a plurality of grippers that grip respective ones of the packaging containers and transfer them to one of the grippers of the transfer arrangement.

14. The arrangement of claim 13, wherein the second conveyor includes a plurality of grippers that each grip one of the packaging containers transferred from the first conveyor.

15. The arrangement of claim 8, wherein the first cam surface comprises: i) a first cam segment engaged by the first cam follower to raise the first pair of gripper elements from a first elevational position to a second elevational position higher than the first elevational position; ii) a second cam segment engaged by the first cam follower to move the first pair of gripper elements while the first pair of gripper elements is at the second elevational position; and iii) a third cam segment engaged by the first cam follower to lower the first pair of gripper elements from the second elevational position.

16. The arrangement of claim 15, wherein the third cam segment is configured to lower the first pair of gripper elements to a third elevational position lower than the first elevational position.

* * * * *